May 23, 1972  M. BEZU  3,664,748
DEVICE FOR AUTOMATICALLY SETTING THE INITIAL HEADING
ABOARD CRAFT UTILIZING GYROSCOPIC NAVIGATION SYSTEMS
Filed Jan. 22, 1970  8 Sheets-Sheet 1

United States Patent Office 3,664,748
Patented May 23, 1972

---

3,664,748
DEVICE FOR AUTOMATICALLY SETTING THE INITIAL HEADING ABOARD CRAFT UTILIZING GYROSCOPIC NAVIGATION SYSTEM
Maurice Bezu, Croissy, France, assignor to Société d'Etudes et de Realisations Electroniques, Asnieres, Hauts-de-Seine, France
Filed Jan. 22, 1970, Ser. No. 4,953
Claims priority, application France, Jan. 31, 1969, 6902012, 6902013; Mar. 13, 1969, 6907054; Mar. 24, 1969, 6908535; Apr. 10, 1969, 6910997
Int. Cl. G01b *11/26*
U.S. Cl. 356—152          22 Claims

ABSTRACT OF THE DISCLOSURE

A device for rapidly ascertaining with great accuracy, by triangulation, the orientation of a stationary movable object in relation to a reference direction and more particularly for ascertaining the heading of an aircraft, characterized by the fact that it includes ground-based means for detecting two markers fixed to the aircraft and defining the longitudinal axis or flight axis thereof, means associated to these detection means and determining the angles at which the aircraft markers are seen by said detection means, a store for registering said angles and computer means which upon acquiring these angle values after interrogating said store solve an equation for determining the aircraft heading.

DESCRIPTION

The present invention relates to a device for ascertaining rapidly and with great accuracy the orientation, with respect to a reference direction, of a stationary craft, whereby to reset the latter's navigation instruments to that orientation. This device is more particularly though not exclusively intended for setting initial aircraft headings.

Initial methods of setting the heading have heretofore consisted either in lining up the aircraft along the runway (the orientation of which is known beforehand) or in setting the navigation instruments on the basis of information furnished by a magnetic compass. A more accurate method utilizes a reference and aligment gyroscope. Such a reference gyroscope, which memorizes a specific heading, is set to the direction (geographical North for instance) of a post fixedly sealed in position close to the runway, after which it is carried aboard the aircraft and positioned along the fore-aft axis thereof.

The reference gyroscope determines the aircraft orientation relatively to the reference direction of the post and its information is used to reset the navigation instruments on to that orientation. While this latter method is more accurate, it requires more time (spinning the gyroscope rotor, stabilization, correction for drift); further, it is a delicate operation which can be carried out only by skilled personnel. Nor can it be used to obtain a very accurate initial setting with a minimum of operations and in a very short time, in the event of an emergency for example.

The present invention overcomes these drawbacks by utilizing two direction-finders of a design well known per se and which can be orientated in azimuth, and two fixed markers placed on the aircraft and lined up along the reference axis of the navigation instruments. The direction-finders determine the orientations of the aircraft makers in relation to a known direction. A computer, which may accompany the initial setting device or be the aircraft computer itself, or else the control tower computer, receives these orientation data and derives the aircraft heading on to which the navigation instruments are to reset.

In one specific embodiment, the two direction-finders of known design are rotatable on a pivoting mount which is itself so orientated in relation to a known direction as to cause the two direction-finders locked on to the aircraft markers to be parellel.

Here also the data defining the orientations of the mount, and of the direction-finders in relation to the mount, are supplied to a computer which may accompany the initial setting device or be the aircraft computer itself or else the control tower computer.

This computer derives the aircraft heading on to which the navigation instruments are to reset.

In an alternative embodiment more particularly intended for an aircraft-carrier installation identical to a ground-based installation, the information concerning the angle which the initial orientation axis of this triangulation device forms with the reference direction (geographical North for example) is supplied by the ship's heading detector, this information varying with the aircraft heading. When however the aircraft-carrier is subjected to rolling and pitching motion, the heading determined by the triangulation device is incorrect, and in certain ship attitudes this device cannot be used at all. For utilization aboard an aircraft-carrier, it is therefore essential to be independent of perturbing rolling and pitching motions of the ship in order to determine an aircraft heading.

The solution consisting in slaving the entire triangulation system to the vertical must be discarded for reasons connected with servocontrol problems, bulk and cost.

In accordance with this invention, the above-mentioned diadvantages are overcome by using data relating to the vertical and supplied, say, by a vertical-axis gyroscope to allow a computer to make the necessary corrections.

The triangulation device is identical to that described precedingly, except that when the direction-finder detects an aircraft marker it interrogates the ship's vertical-sensor. The data on the vertical (roll and pitch) is stored in a memory together with the positional data supplied by a digital encoder and is subsequently used by the computer which projects this data in the horizontal plane whereby to accurately derive the tube heading of the aircraft on to which the navigation instruments are to be reset.

Should it be desired to multiply the number of initial setting stations on an aerodrome, however, this arrangement requires an initial setting device for each station. Furthermore, this solution, as well as being costly, would take up too much ground space.

In accordance with a specific embodiment of this invention that overcomes these drawbacks, the initial setting device is self-contained yet is informed of its revised orientation relative to a reference direction at each new location.

The reference direction is provided by two ground markers which are placed on the aerodrome or in proximity thereto and which can be positioned at a very great distance from each other.

The initial setting device, which can be moved as required, is preferably mounted on a vehicle for transporting it close to the aircraft whose heading it is required to know. The vehicle and the initial setting device are so immobilized in relation to the aircraft as to make the measurements described possible.

The two direction-finders forming the main components of the initial setting device detect the ground markers and determine the angles at which they see them. The angular data are transmitted and stored in a memory at their respective addresses, for subsequent processing by a computer which may with advantage be the control tower computer. When it is in possession of all these data, the computer derives the angle which the initial setting device forms with the reference direction.

Depending on the position and orientation of the initial setting device with respect to the two ground markers defining the reference direction, the computer must solve previously programmed equations which differ very little, it being possible for the initial setting device itself to inform the computer of the equation which the latter must solve.

In still another embodimet of the present invention, recourse is had to two electronic direction-finders of design well known per se, and to two fixed markers placed on the aircraft and aligned along the reference axis of the navigation instruments, which is the fore-aft axis of the aircraft. Each direction-finder determines the orientation of each aircraft marker in relation to its own, known orientation. A computer, which may accompany the initial setting device or be the aircraft computer itself or else the control tower computer, receives the orientation data and derives the aircraft heading to which the navigation instruments are to be reset.

For applications aboard an aircraft-carrier, use is made of data concerning the vertical, supplied for example by a vertical-axis gyroscope, whereby to so control the electronic boresight of each direction-finder that the signals suplied by the sensors be projections in the horizontal plane of the aircraft-marker and direction-finder orientations.

The description which follows with reference to the accompanying non-limitative exemplary drawings will give a clear understanding of how the invention can be carried into practice.

Figure 1:
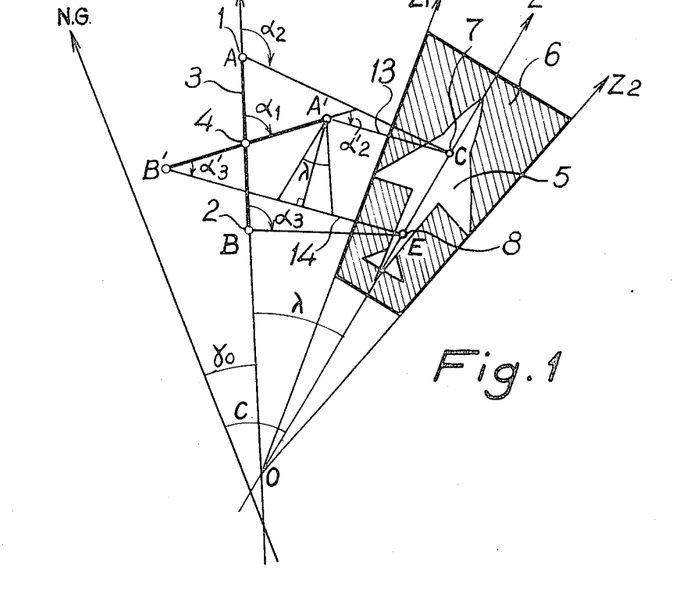
FIG. 1 is a schematic plan view of an initial aircraft-heading setting device according to the invention.

Referring first to FIG. 1, the initial setting device shown thereon includes two direction-finders 1 and 2 well known per se mounted on the ends of an arm 3 of length AB capable of swivelling at its midpoint 4 about its vertical axis. Arm 3 is initially orientated along a direction OX forming an angle $\gamma_0$ with a reference direction NG (the geographical North for example). The angle $\gamma_0$ is measured with great accuracy once and for all when the device is set up and may be equal to zero if the device was originally laid along said reference direction.

The aircraft 5 is led on to an apron 6 bounded by the two directions $OZ_1$ and $OZ_2$ and so located in relation to the two direction-finders 1 and 2 as to make the measurements described hereinbelow possible at all times.

The two direction-finders 1 and 2 initially aligned along OX are capable of pivoting about their respective vertical axes.

Figure 2:
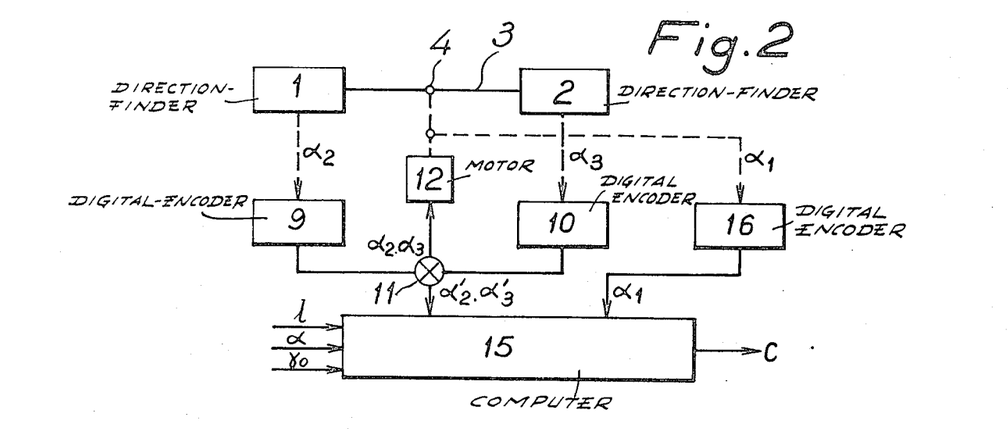
FIG. 2 is a block diagram explaining the manner of operation of the device in FIG. 1.

The installation is rendered operative by an operator, or automatically by the aircraft pilot, or by the control tower, as soon as the aircraft has come to a stop on the apron 6. As they rotate, the two direction-finders 1 and 2, the zero positions of which are marked in relation to the arm 3 lying along the direction OX, detect the aircraft markers 7 and 8, which markers are light sources placed at the points C and E on the fore-aft axis OZ of the aircraft. For greater accuracy, these two light sources may be fast with the support of the aircraft's twin-gyroscope platform. Direction-finder 1 is equipped with an interference filter having the same characteristics as that placed before the light source 7; similarly, direction-finder 2 and light source 8 are equipped with identical interference filters having a wavelength characteristic different from that of the interference filters of direction-finder 1 and light source 7, whereby direction-finder 1 detects only source 7 and direction-finder 2 detects only source 8. Light sources 7 and 8 may of course be differentiated by any other convenient coding device. Direction-finder 1 orientates through an angle $\alpha_2$ and direction-finder 2 through an angle $\alpha_3$ and they remain constantly locked on to their respective light sources 7 and 8 by a servocontrol system (not shown). As they rotate, direction-finders 1 and 2 drive the two digital encoders 9 and 10 of identical design which supply the angular position data $\alpha_2$ and $\alpha_3$.

These two data $\alpha_2$ and $\alpha_3$ are compared at 11, and a resultant signal proportional to the difference between these two angles drives in the appropriate direction a motor 12 (the mechanical connections being shown in dash lines) which swivels arms 3 pivoted at 4 through an angle $\alpha_1$ such that the new orientation angles $\alpha'_2$ and $\alpha'_3$ of direction-finders 1 and 2 be equal, i.e. such that the boresights 13 and 14 be parallel. Direction-finder 1 moves to A' and direction-finder 2 to B'. The aircraft heading angle is then given by the following formula:

$$C = \gamma_0 + \lambda$$

$$\lambda = \alpha_1 + \alpha'_3 + \text{arc cos}\, \frac{l \sin \alpha'_3}{d} = \frac{\pi}{2}$$

$$C = \gamma_0 + \alpha_1 + \alpha'_3 + \text{arc cos}\, \frac{l \sin \alpha'_3}{d} = \frac{\pi}{2}$$

where $l$=AB, the distance between the two direction-finders 1 and 2, $d$=CE, the distance between the two aircraft markers 7 and 8, AB being greater than $d$.

When angle $a'_2$ is equal to $\alpha'_3$ a computer 15 receives information relating to this angle, to the angle $\alpha_1$ formed by arm 3 and supplied by its digital encoder 16, and to the constant $l$, $d$ and $\gamma_0$, which may be preliminary inputs for storage in computer 15. Once it is in possession of all these data, computer 15 derives the aircraft heading C by resolving the above equation. The heading information C is then available for transmission by wire, by radio, or by any other known means, to the aircraft navigation instruments for resetting thereof on to that datum.

For aircraft-carrier applications of the initial setting device as hereinabove described, the information $\gamma_0$, which depends at all times on the ship's orientation, is transmitted to computer 15 by the ship's heading sensor.

Figure 3:
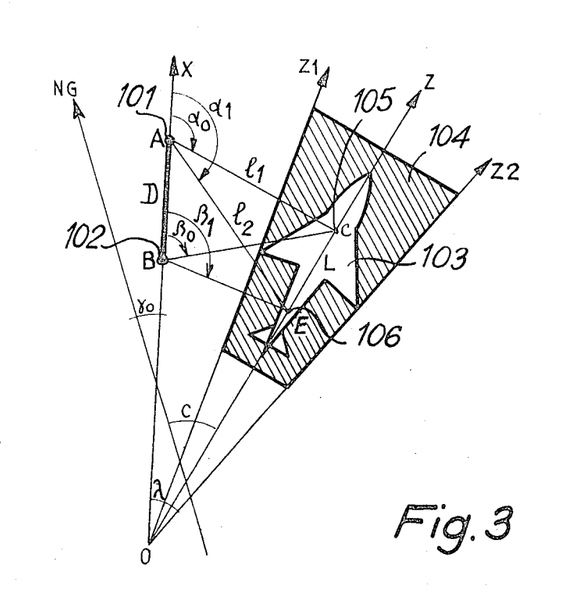
FIG. 3 is a schematic plan view of an initial aircraft heading setting device according to the invention.

The initial setting device shown in FIG. 3 includes two direction-finders 101 and 102 of known design, placed at points A and B, separated from each other by a distance D, and aligned on a direction OX forming an angle $\gamma_0$ with a reference direction NG such as the geographical North. The angle $\gamma_0$ is measured with very great accuracy once and for all when the device is set up and may be equal to zero if the device is originally aligned on said reference direction.

The aircraft 103 is led on to an apron 104 bounded by the two direction $OZ_1$ and $OZ_2$ and so located in relation to direction-finders 101 and 102 as to make the measurements described hereinbelow possible at all times.

Referring to FIG. 3, the two direction-finders 101 and 102 initially aligned on direction OX are capable of clockwise rotation about their respective vertical axes. Activation of this system is controlled by an operator, or automatically by the aircraft pilot, or by the control tower, as soon as the aircraft is stationary on apron 104. Direction finders 101 and 102, the zero settings of which corresponds to alignment upon OX, detect, as they rotate, the relative orientations of aircraft markers 105 and 106, which markers may be light sources placed at the points C and E along the reference axis OZ of the aircraft navigation instruments. For greater accuracy, the two light sources 105 and 106 may be carried on the support of the aircraft's twin-gyroscope platform. Direction-finder 101 detects the orientation of source 105 (angle $\alpha_0$), followed by that of light source 106 (angle $\alpha_1$); similarly, direction-finder 102 detects the orientation of light source 105 (angle $\beta_0$), followed by that of light source 106 (angle $\beta_1$). In order to permit discrimination between light sources 105 and 106, the latter are made different by means of interference filters placed before them, or by means of any other convenient coding device.

Knowing $\alpha_0$, $\alpha_1$, $\beta_0$, $\beta_1$ and $\gamma_0$, the aircraft heading angle C can be calculated as follows:

$$\widehat{ACB} = \alpha_0 - \beta_0 \quad \widehat{AEB} = \alpha_1 - \beta_1$$

$$\frac{\overline{AC}}{\sin \widehat{ABC}} = \frac{\overline{AB}}{\sin \widehat{ACE}} \quad \text{whence} \quad \overline{AC} = l_1 = D \frac{\sin \beta_0}{\sin(\alpha_0 - \beta_0)}$$

$$\frac{\overline{AE}}{\sin \widehat{ABE}} = \frac{\overline{AB}}{\sin \widehat{AEB}} \quad \text{whence} \quad \overline{AE} = l_2 = D \frac{\sin \beta_1}{\sin(\alpha_1 - \beta_1)}$$

$$\overline{CE} = L = \sqrt{l_1^2 + l_2^2 - 2 l_1 l_2 \cos(\alpha_1 - \alpha_0)}$$

$$\frac{l_2}{\sin \widehat{ACE}} = \frac{L}{\sin(\alpha_1 - \alpha_0)} \quad \text{whence} \quad \sin \widehat{ACE} = \frac{l_2}{L} \sin(\alpha_1 - \alpha_0)$$

$$\lambda = \alpha_0 - \arcsin \frac{l_2}{L} \sin(\alpha_1 - \alpha_0)$$

and $$C = \gamma_0 + \alpha_0 - \arcsin \frac{l_2}{L} \sin(\alpha_1 - \alpha_0)$$

By expansion, $$C = \gamma_0 + \alpha_0 - \arcsin \frac{\sin \beta_1}{\sin(\alpha_1 - \beta_1)} \sin(\alpha_1 - \alpha_0) \cdot$$

$$1 / \sqrt{\left[\frac{\sin \beta_0}{\sin(\alpha_0 - \beta_0)}\right]^2 + \left[\frac{\sin \beta_1}{\sin(\alpha_1 - \beta_1)}\right]^2 - 2 \left[\frac{\sin \beta_0}{\sin(\alpha_0 - \beta_0)} \cdot \frac{\sin \beta_1}{\sin(\alpha_1 - \beta_1)}\right] \cdot \cos(\alpha_1 - \alpha_0)}$$

Figure 4:
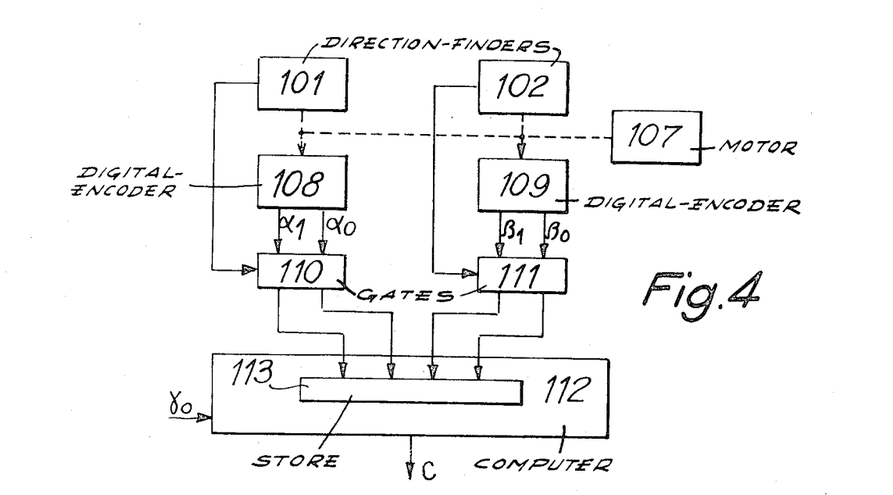
FIG. 4 is a block diagram explaining the manner of operation of the device in FIG. 3.

Referring next to FIG. 4, the direction-finders 101 and 102 are rotated about their vertical axes by a motor 107 and drive digital encoders 108 and 109 of known design which continuously define the angular positions of said direction-finders. The mechanical links between motor 107, direction-finders 101 and 102 and digital encoders 108 and 109 are shown in dash-lines.

Upon rotating and detecting light sources 105 and 106 in that order, direction-finder 101 triggers a signal for enabling a gate 110 which accordingly lets through the position data $\alpha_0$ and $\alpha_1$ in that order, as defined by the digital encoder 108. Similarly, a gate 111 controlled by direction-finder 102 lets through the position data $\beta_0$ and $\beta_1$ in that order, as defined by digital encoder 109 upon detection by this direction-finder 102 of light sources 105 and thereafter 106. A computer 112 comprises a store 113 which registers the successive data $\alpha_0$, $\alpha_1$, $\beta_0$ and $\beta_1$ supplied to it, and said computer further receives the information $\gamma_0$. Once in possession of all these data, the computer calculates the initial aircraft heading C by solving the equation stated precedingly.

The heading information C then becomes available for transmission by wire, by radio or by any other known means, to the navigation instruments for resetting thereof accordingly.

For aircraft-carrier applications of the initial setting device hereinbefore described, the information $\gamma_0$, which depends at all times on the ship's heading, is transmitted to computer 112 by the ship's heading detector.

Figure 5:
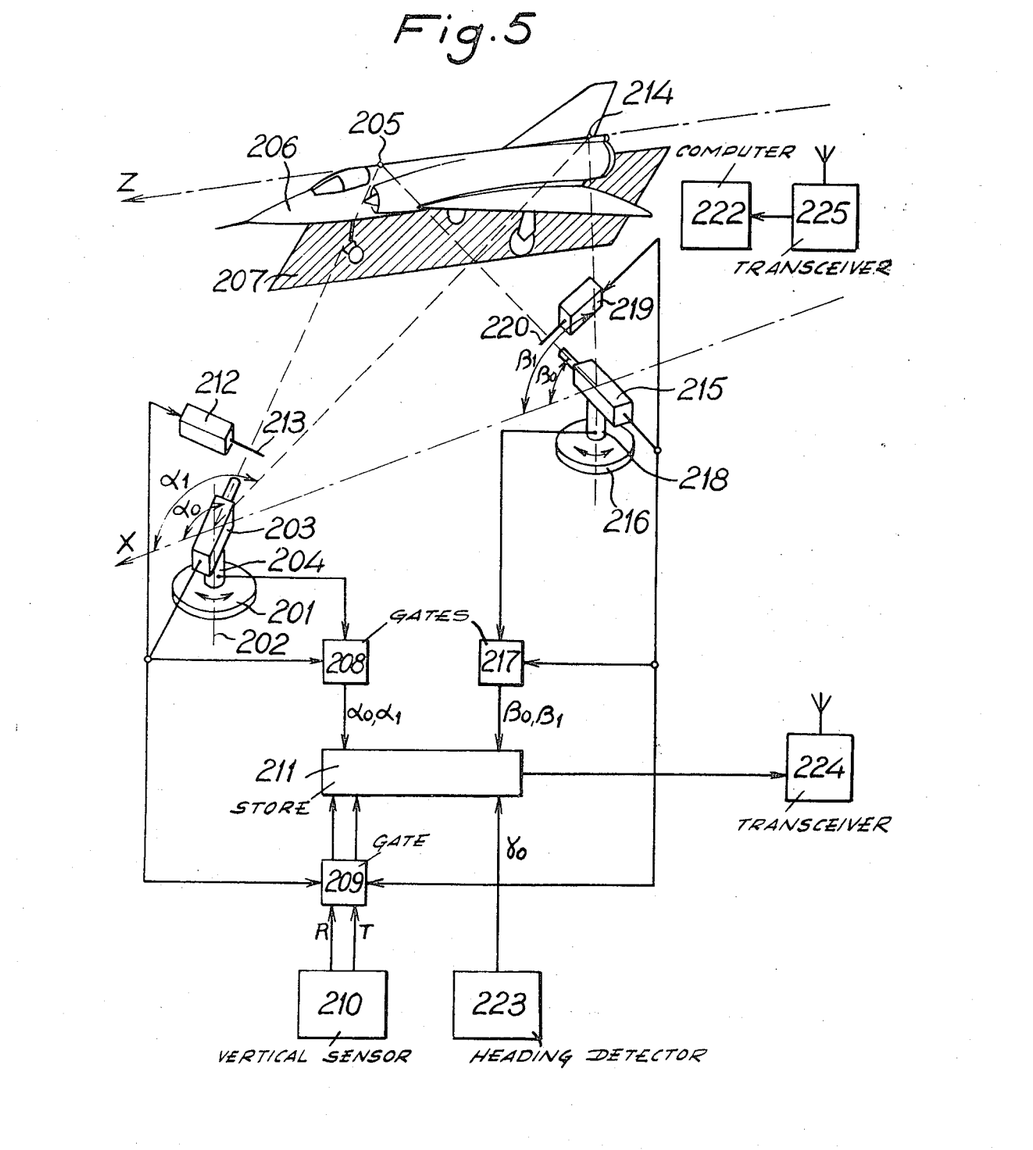
FIG. 5 is an explanatory diagram showing the manner of operation of a triangulation device more particularly intended for setting the initial headings of aircraft aboard an aircraft-carrier.

Referring now to FIG. 5, a platform 201 shown thereon rotates a direction-finder 203 associated to a digital angle encoder 204 about the vertical axis 202. When in the course of its rotation direction-finder 203 detects marker 205 (angle $\alpha_0$) of the aircraft 206 stationary on the marked-out apron 207, it delivers a signal which on the one hand enables a gate 208 which thereupon lets through the information $\alpha_0$ defined by digital angle encoder 204 and, on the other hand, enables a gate 209 which thereupon lets through the roll and pitch vertical-data, as continuously supplied by the vertical sensor 210. These data, which define the angle at which aircraft marker 205 is seen by direction-finder 203 and the ship attitudes at the instant of detection of said marker 205, are registered in a store 211. The signal issuing from direction-finder 203 may be advantageously used in addition to activate a selector 212 which accordingly interposes a suitable interference filter 213 on the boresight whereby to allow direction-finder 203 to thereafter detect the second aircraft marker 214. The fresh signal issuing from direction-finder 203 when the same detects aircraft marker 214 then enables gates 208 and 209, which thereupon let through the information $\alpha_1$ and the ship data on the vertical at the instant this further detection occurs.

Similarly, when direction-finder 215 rotated by a platform 216 detects aircraft marker 205 or 214, a signal activates, on the one hand, gate 217 which thereupon lets through the position data $\beta_0$ or $\beta_1$ supplied by digital encoder 218, which are the angles at which aircraft markers 205 and 214 are seen by direction-finder 215, and, on the other hand, gate 209 which thereupon lets through the vertical data. This same signal may be used with advantage to activate a selector 219 for selecting interference filters 220, for the reasons indicated precedingly.

Computer 222, which may be the aircraft computer, receives from store 211 the positional data $\alpha_0$, $\alpha_1$, $\beta_0$, $\beta_1$, together with the ship roll-and-pitch attitude data corresponding to each of these data, as well the information $\gamma_0$ delivered by the ship's heading detector 223. These data may be transmitted by transceivers 224 and 225.

On the basis of the positional data supplied by digital encoders 203 and 215 and with the help of the data relating to the vertical, computer 222 projects the positional data in the horizontal plane whereby to accurately compute the true aircraft heading on to which the navigation instruments must reset.

Figure 6:
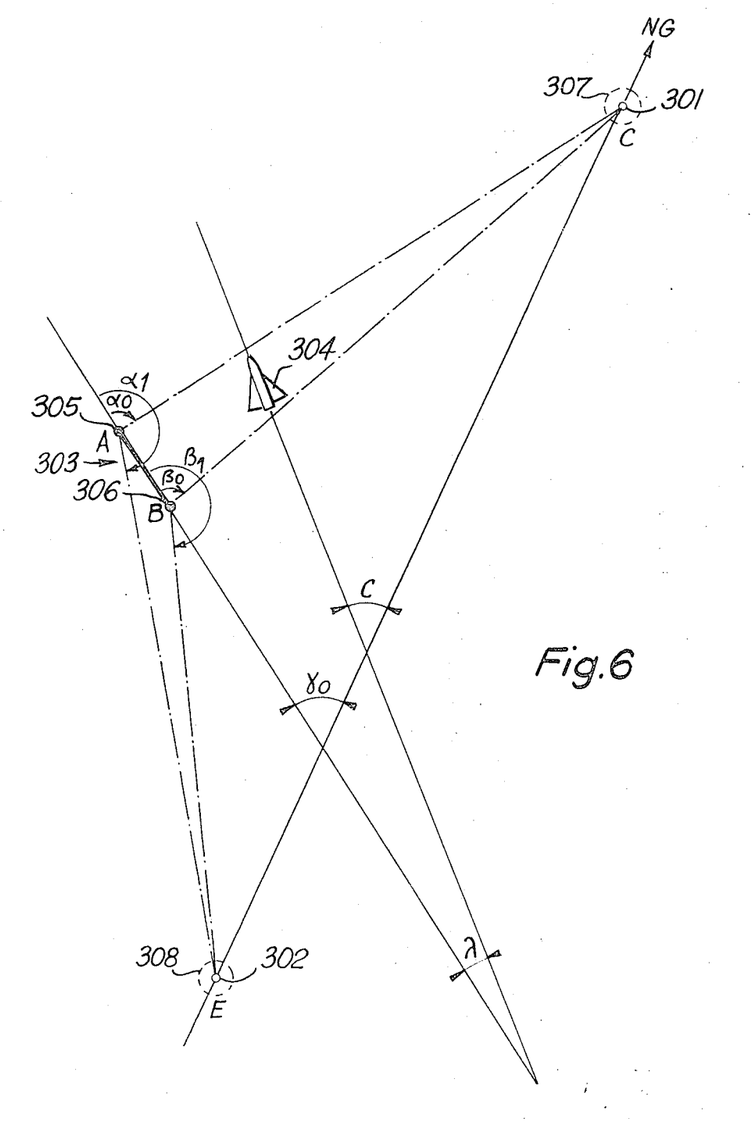
FIG. 6 is a schematic plan view of an initial setting device according to the invention, for detecting ground markers.

Reference to FIG. 6 shows two markers 301 and 302 placed on the ground at the points C and E respectively and lying along a reference direction NG such as the geographical North. By means of a vehicle for example, upon which it may be fixedly mounted, an initial setting device 303 identical to that described with reference to FIGS. 3 and 4 is conveyed to a point proximate an aircraft 304 the heading angle C of which it is required to know. Initial setting device 303 is brought to a halt at a point in relation to aircraft 304 such that detection of the aircraft markers be feasible under the best possible conditions. The direction-finders 305 and 306 located at points A and B detect the angles at which they see the ground markers 301 and 302, which markers may be two very powerful light sources to enable them to be placed at points far away from the place where the initial setting operation is to be performed, in order to ensure accuracy of the measurements.

Ground marker 301 is equipped with an interference filter 307 of wavelength $\lambda_1$, and ground marker 302 with an interference filter 308 of wavelength $\lambda_2$ in order to better discriminate between said ground markers.

Upon the boresights of direction-finders 305 and 306 are interposed in succession interference filters of wavelength $\lambda_1$ and $\lambda_2$, and these direction-finders detect the ground markers 301 and 302 and determine the angles $\alpha_0$, $\alpha_1$, $\beta_0$ and $\beta_1$ at which they see said markers.

Figure 7:
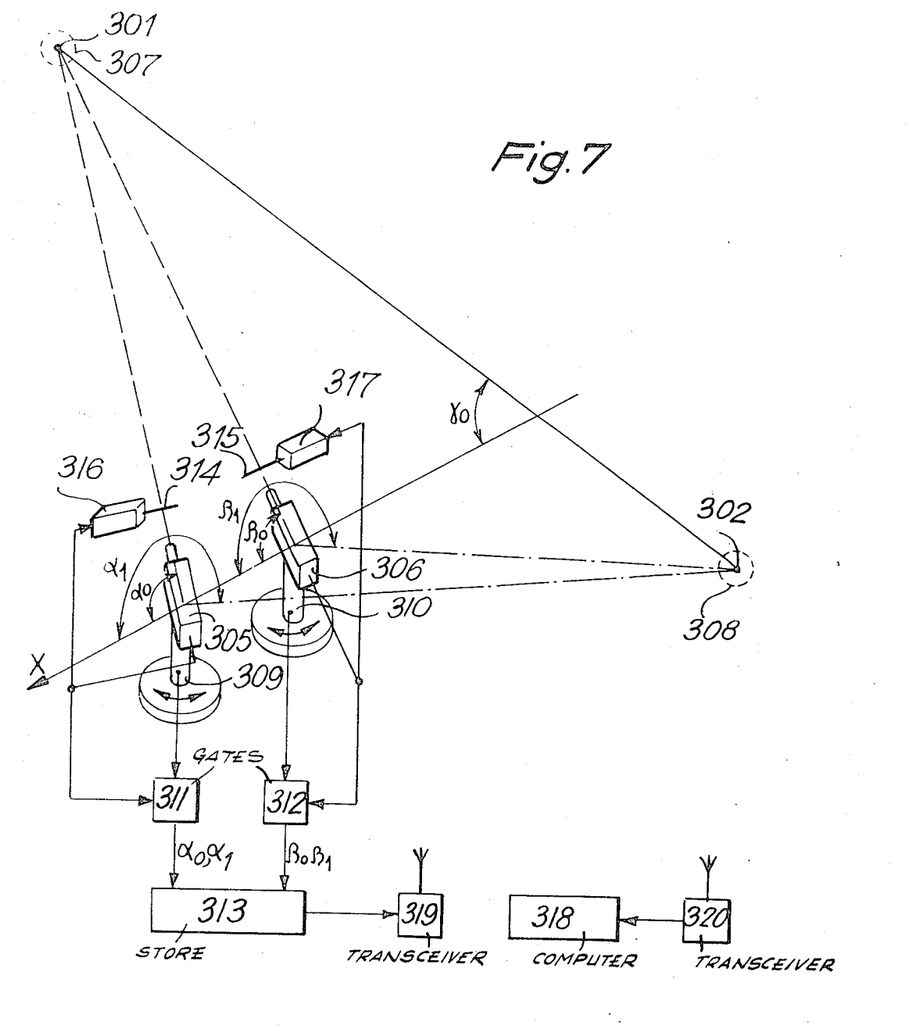
FIG. 7 is a diagram explaining the manner of operation of the initial setting device shown in FIG. 6, for determining its own orientation.

Reference is next had to FIG. 7, in which the angle data $\alpha_0$, $\alpha_1$ and $\beta_0$, $\beta_1$ respectively delivered by digital encoders 309 and 310 associated to direction-finders 305 and 306 are transmitted through gates 311 and 312 to their respective addresses in store 313.

The address of an angle datum is defined by the characteristic (wavelength $\lambda_1$ or $\lambda_2$) of interference filter 314 or 315 positioned by selector 316 or 317 along the boresight of direction-finder 305 or 306, and also by direction-finder 305 or 306 supplying this information, which information is the angle at which one of said direction-finders sees that one of the two ground markers which is equipped with the interference filter of identical characteristic.

A computer 318, which may be the aerodrome computer, interrogates store 313 and, on the basis of the angle data $\alpha_0$, $\alpha_1$, $\beta_0$ and $\beta_1$ transmitted by the transceivers 319 and 320, or by any other convenient means, derives the heading angle $\gamma_0$ of the initial setting device.

This information $\gamma_0$ is transmitted to store 313 of said device for subsequent retransmission to the aircraft's on-board computer.

The initial setting device may occupy different positions in relation to ground markers 301 and 302. When the angles $\alpha_1$ and $\beta_1$ at which direction-finders 305 and 306 see marker 302 are less than $\pi$ radians, angle $\gamma_0$ is computed in the way described with reference to FIGS. 3 and 4 for computing angle $\lambda$. If angles $\alpha_1$ and $\beta_1$ are greater than $\pi$ radians, as shown in FIG. 6, or greater than $3\pi/2$ radians, the computation becomes different and certain terms change sign. In all these exemplary cases, the equations to be solved are all programmed and, on the basis of the angles they detect, the direction-finders give the computer 318 the equation it must solve.

Figure 8:
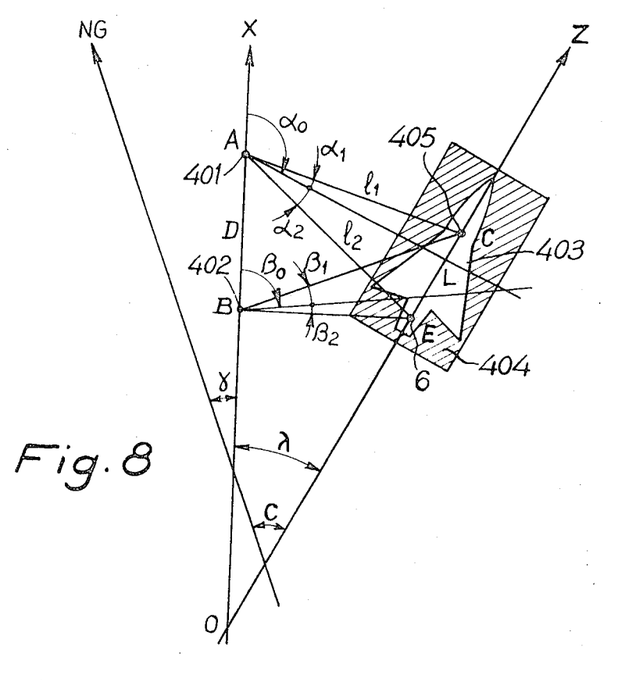
FIG. 8 is a schematic plan view of an initial aircraft setting device according to an alternative embodiment of the invention.

In FIG. 8, the initial setting device includes two direction-finders 401 and 402 of known design, placed at the points A and B and separated from each other by a distance D along a direction OX forming an angle $\gamma$ with a reference direction NG such as the geographical North. The angle $\gamma$ is measured with very great accuracy when the device is set up and may be equal to zero if said device is originally orientated along said reference direction. For aircraft-carrier applications the angle $\gamma$, which varies constantly, is supplied by the ship's heading detector. The direction OX is the ship's fore-aft axis.

The aircraft 403 is led on to an apron 404 marked out and located in such manner in relation to the two direction-finders 401 and 402 as to make the measurements described hereinbelow possible at all times.

The boresight of direction-finder 401 forms an angle $\alpha_0$ with the direction OX, and that of direction-finder 402 an angle $\beta_0$ therewith.

Two markers 405 and 406 positioned respectively at the points C and E define the longitudinal reference axis OZ of the aircraft, which axis is the reference axis of the navigation instruments of aircraft 403. The two markers 405 and 406 may be light sources which may be differentiated by interference filters placed before them, or by any other coding means, whereby better to discriminate between them. The two direction-finders 401 and 402, the optical fields of which contain the two aircraft markers 405 and 406, detect the positions thereof.

Direction-finder 401 determines the angle $\alpha_1$ at which it sees marker 405 and thereafter the angle $\alpha_2$ at which it sees the second marker 406; similarly, direction-finder 402 determines the angles $\beta_1$ and $\beta_2$ at which it sees markers 405 and 406 respectively.

Knowing $\alpha_0$, $\alpha_1$, $\alpha_2$, $\beta_0$, $\beta_1$, $\beta_2$ and $\gamma$, the aircraft heading angle C is computed as follows:

$$\widehat{ACB} = \alpha_0 + \beta_1 - \alpha_1 - \beta_0$$

$$\widehat{AEB} = \alpha_0 + \alpha_2 - \beta_0 - \beta_2$$

$$\frac{AC}{\sin \widehat{ABC}} = \frac{AB}{\sin \widehat{ABC}} \text{ whence } \overline{AC} = l_1$$

$$= D \frac{\sin (\beta_0 - \beta_1)}{\sin (\alpha_0 + \beta_1 - \alpha_1 - \beta_0)}$$

$$\frac{AE}{\sin \widehat{ABE}} = \frac{AB}{\sin \widehat{AEB}} \text{ whence } \overline{AE} = l_2$$

$$= D \frac{\sin (\beta_0 + \beta_2)}{\sin (\alpha_0 + \alpha_2 - \beta_0 - \beta_2)}$$

$$\overline{CE} = L = \sqrt{l_1^2 + l_2^2 - 2l_1 l_2 \cos (\alpha_2 + \alpha_1)}$$

$$\frac{l_2}{\sin \widehat{ACE}} = \frac{L}{\sin (\alpha_2 + \alpha_1)} \text{ whence } \sin \widehat{ACE}$$

$$= \frac{l_2}{L} \sin (\alpha_2 + \alpha_1)$$

$$\lambda = \alpha_0 - \alpha_1 - \text{arc } \sin \frac{l_2}{L} \sin (\alpha_2 + \alpha_1)$$

$$C = \gamma + \lambda$$

Expanding, we have:

$$C = \gamma + \alpha_0 - \alpha_1 - \text{arc } \sin \frac{\sin (\beta_0 + \beta_2)}{\sin (\alpha_0 + \alpha_2 - \beta_0 - \beta_1)}$$

$$\sin (\alpha_2 + \alpha_1)$$

$$1 \Big/ \sqrt{\left[\frac{\sin (\beta_0 - \beta_1)}{\sin (\alpha_0 + \beta_1 - \alpha_1 - \beta_0)}\right]^2 + \left[\frac{\sin (\alpha_0 + \beta_2)}{\sin (\alpha_0 + \alpha_2 - \beta_0 - \beta_1)}\right]^2 - 2\left[\frac{\sin (\beta_0 - \beta_1)}{\sin (\alpha_0 + \beta_1 - \alpha_1 - \beta_0)} \cdot \frac{\sin (\beta_0 + \beta_2)}{\sin (\alpha_0 + \alpha_1 - \beta_0 - \beta_2)} \cdot \cos (\alpha_1 + \alpha_2)\right]}$$

Figure 9:
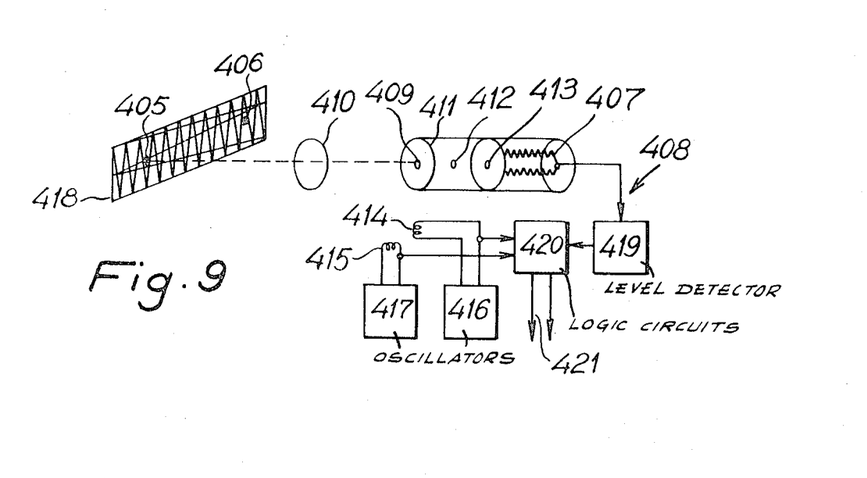
FIG. 9 is a block diagram showing the manner of operation of the sensing element or direction-finder used in the last-mentioned initial setting device.

Sensing elements 401 and 402 are direction-finders of a design well known per se, which are described hereinbelow with reference to FIG. 9 for a better understanding of the theory of operation of the initial heading setting system of this invention.

The sensing element is a optical device utilizing a multiplier phototube 407 associated to suitable electronics 408. The image 409 of aircraft marker 405 is formed on the photocathode 411 of multiplier phototube 407 through the agency of suitable focusing optics 410 selected according to the size, distance and brightness of the aircraft marker. The inside face of photocathode 411 emits electrons which form an electronic image 412 which is accelerated and focused by an electric field. Only the image formed over the aperture 413 penetrates into the accelerating dynodes. The output voltage is a linear function of the image portion appearing through aperture 413. Two deflection coils, to wit a vertical coil 414 and a horizontal coil 415, energized by two oscillators 416 and 417, permit vertical and horizontal displacement of the electronic image about said aperture. The horizontal and vertical sweep covers a large area 418 that contains the two aircraft markers 405 and 406 regardless of the position of the aircraft on the marked-out apron. Level sensors 419 inform logic circuits 420 of the exact moment when the electronic image 412 is observed, and the logic circuits simultaneously interrogate the deflection system 414, 415 in order to ascertain the transfers and vertical positions of electronic unit 412 at the instant when the same is observed. The transverse-deflection interrogation signal 421 is a direct measurement of the position of aircraft marker 405 in relation to the boresight of the sensing element.

Figure 10:
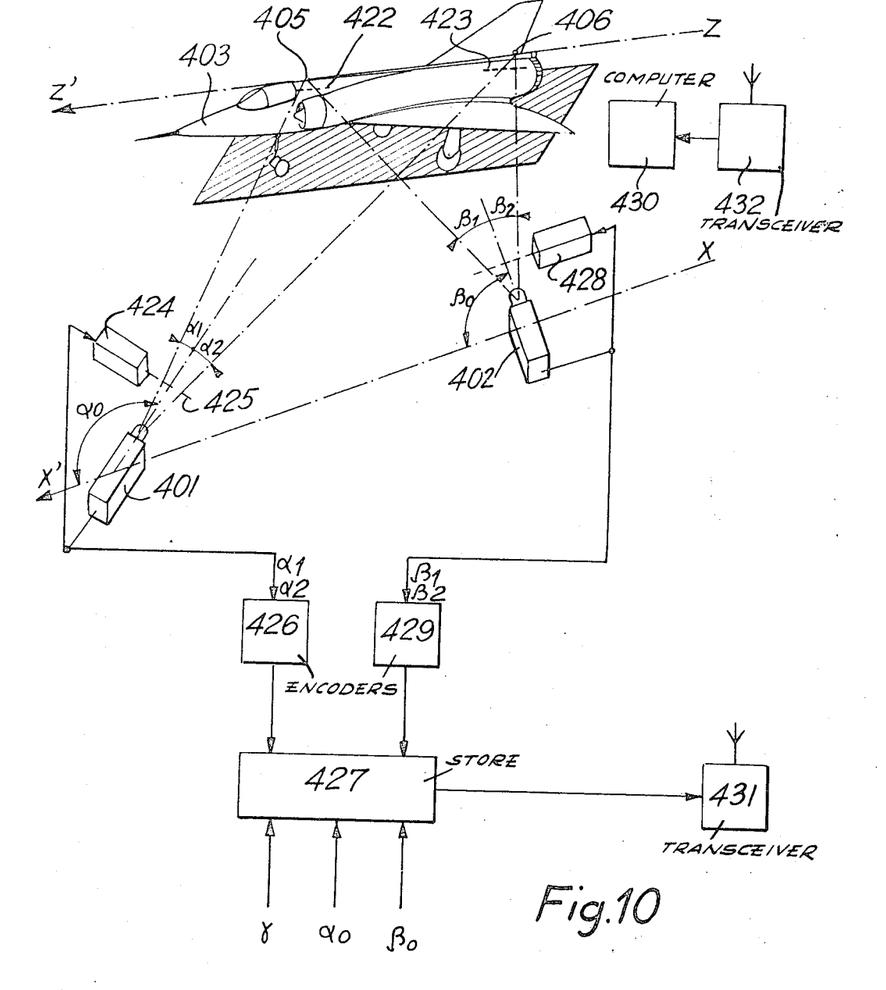
FIG. 10 is a diagram explaining the manner of operation of the device shown in FIG. 8 for setting the initial headings of aircraft on the ground.

Reference is now had to FIG. 10, in which the two stationary direction-finders 401 and 402 are positioned along a direction XX'. The boresight of direction-finder 401 is orientated through $\alpha_0$ and the boresight of direction-finder 402 through $\beta_0$. Aircraft markers 405 and 406 define the aircraft fore-aft axis ZZ'. Two interference filters 422 of wavelength $\lambda_1$ and 423 of wavelength $\lambda_2$ are positioned in front of light sources 405 and 406 respectively. An automatic selector 424 interposes an interference filter 425 of wavelength $\lambda_1$ on the boresight of direction-finder 401, which direction-finder detects the corresponding light source 405 and thereupon delivers an electrical signal proportional to the angle $\alpha_1$ at which it sees said light source 405. Said signal controls, inter alia, automatic selector 402, which places the interference filter of wavelength $\lambda_2$ before direction-finder 401, whereby the latter is able to detect the second light source 406. The electrical signals defining angles $\alpha_1$ and $\alpha_2$ are encoded at 426 and transmitted to their respective addresses in the store 427.

Similarly, direction-finder 402 detects the light sources 405 and 406 as a function of the characteristics of the interference filters positioned along its boresight by automatic selector 428. The electrical signals defining angles $\beta_1$ and $\beta_2$ are encoded at 429 and thereafter transmitted to their respective addresses in store 427. The constants $\alpha_0$, $\beta_0$, and $\gamma$ are registered beforehand.

Through the agency of transceivers 431 and 432, a computer 430, which may be the on-board computer of the aircraft, receives from store 427 the data $\alpha_1$, $\alpha_2$, $\beta_1$, $\beta_2$, $\alpha_0$, $\beta_0$ and $\gamma$ and derives the aircraft heading therefrom by solving the equation stated precedingly.

For aircraft-carrier applications it is essential to be independent of parasite ship motions. This is achieved by concretizing the parasite rolling and pitching motions of the ship and hence of the initial setting device by using a vertical-sensing element fast with the ship and by correcting the electronic image by deflecting the electron beam through an angle equal and opposite to the deviation of the ship's axis from the corresponding axis of the vertical-sensor.

Figure 11:
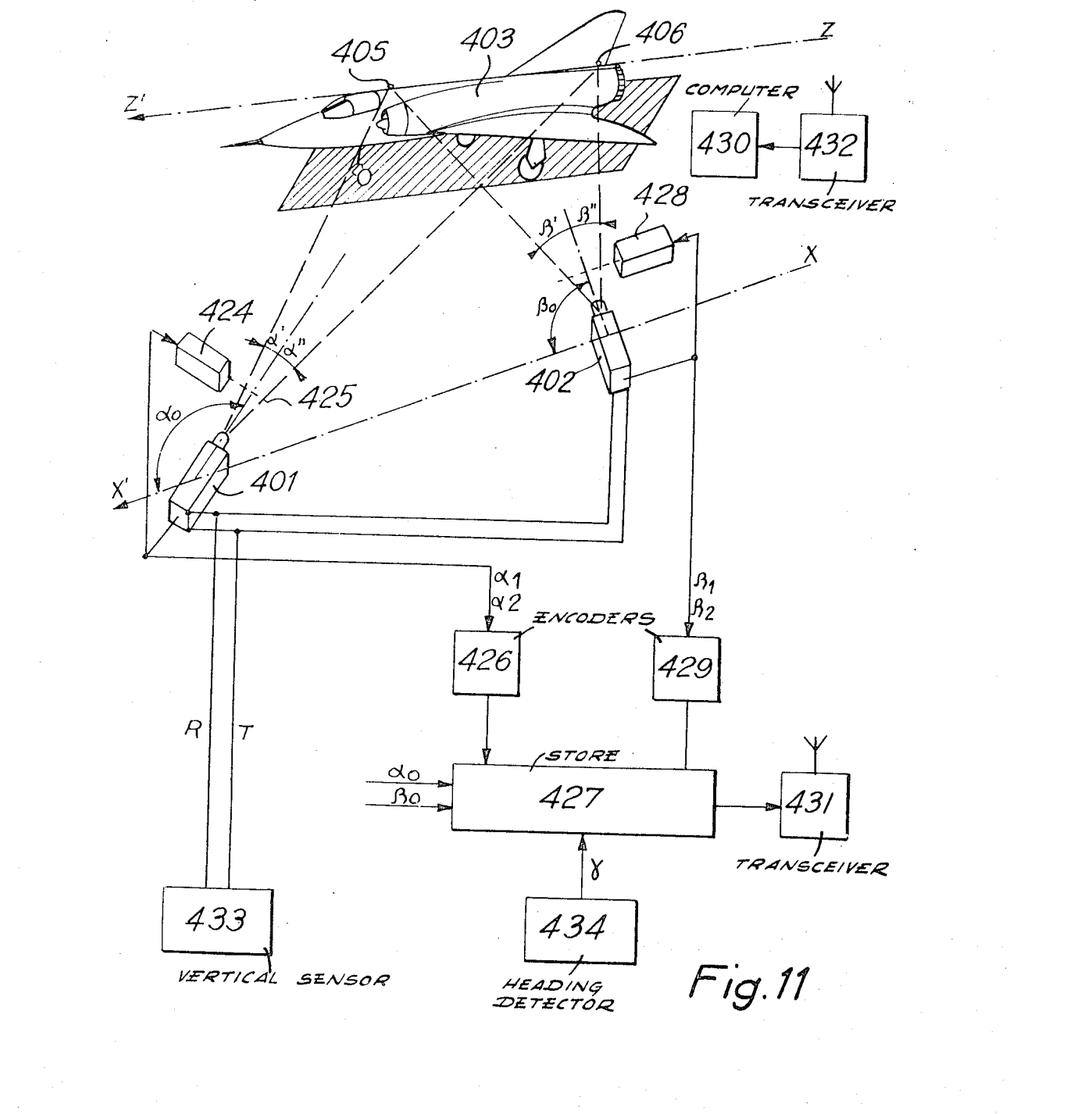
FIG. 11 is a diagram showing the manner of operation of the device shown in FIG. 8 for the initial setting of aircraft aboard aircraft-carriers.

Referring lastly to FIG. 11, the initial setting device shown thereon, which is identical to that described precedingly, has its axis XX' coinciding with the ship's roll axis. A vertical-sensor 433, which may be the ship's vertical-axis gyroscope, concretizes the ship's pitching and rolling angles. A sensing element on each axis of the vertical-sensor supplies electrical signals respectively corresponding to the pitch angle T and the roll angle R, and these signals are applied to the corresponding correcting elements of each of direction-finders 401 and 402 whereby to keep the electron beams thereof in a horizontal plane.

Direction-finder 401 detects the markers 405 and 406 of aircraft 403 and transmits angle data $\alpha_1$ and $\alpha_2$ which are projections in the horizontal plane of angles $\alpha'$ and $\alpha''$ respectively, which are the angles at which direction-finder 401 sees markers 405 and 406. Similarly, direction-finder 402 detects markers 405 and 406 and transmits angle data $\beta_1$ and $\beta_2$ which are projections in the horizontal plane of angles $\beta'$ and $\beta''$ respectively, which angles are those at which direction-finder 402 sees markers 405 and 406.

The electrical signals defining angles $\alpha_1$, $\alpha_2$, $\beta_1$ and $\beta_2$, after being encoded at 426 and 429, are transmitted to their respective addresses in store 427, together with the $\gamma$-information delivered by the ship's heading detector 434, which $\gamma$-information varies with the ship's heading, the constants $\alpha_0$ and $\beta_0$ having been stored beforehand.

The addresses of angles $\alpha_1$, $\alpha_2$ and $\beta_1$, $\beta_2$ are defined by direction-finder 401 and 402 and by the characteristic (wavelength $\lambda_1$ and $\lambda_2$) of the filter 425 placed in the boresights of direction-finder 401 and 402 respectively by automatic selectors 424 and 428. Through the agency of transceivers 431 and 432, a computer 430, which may be the aircraft's on-board computer, receives the data $\alpha_1$, $\alpha_2$, $\beta_1$, $\beta_2$, $\alpha_0$, $\beta_0$ and $\gamma$ whereby to derive the aircraft heading by resolving the equation stated precedingly.

The initial aircraft-heading setting device of this invention is controlled by an operator, or automatically by the aircraft pilot, or by the control tower, as soon as the aircraft has stopped on the marked-out apron.

It goes without saying that many detail changes could be made to the non-limitative exemplary embodiments hereinbefore described without departing from the scope of the present invention.

What is claimed is:

1. A device for rapidly ascertaining with great accuracy, by triangulation, the orientation of a stationary movable object in relation to a reference direction and more particularly for ascertaining the heading of an aircraft, characterized by the fact that it includes ground-based means for detecting two markers fixed to the aircraft and defining the longitudinal axis or flight axis thereof, means associated with said detection means and determining the angles at which the aircraft markers are seen by said detection means, a store for registering said angles and computer means which upon acquiring these angle values after interrogating said store solve an equation for determining the aircraft heading.

2. A device according to claim 1, characterized by the fact that the aircraft markers are two light sources a certain distance apart.

3. A device according to claim 2, characterized by the fact that the light sources are placed on the aircraft's twin-gyroscope platform support in the axis of the navigation instruments.

4. A device according to claim 2, characterized by the fact that interference filters of different wavelengths are placed before the light sources in order to differentiate therebetween.

5. A device according to claim 1, characterized by the fact that said detection means are two direction-finders supported on an orientated mount, separated from each other by a certain distance, and capable of pivoting about their respective vertical axes in order to detect said light sources during their pivotal motion.

6. A device according to claim 5, characterized by the fact that the means for driving the two direction-finders is a motor which is activated by an operator, or automatically by a pilot's command, or by a control tower command.

7. A device according to claim 1, characterized by the fact that each direction-finder is associated to a digital encoder which continuously supplies data on the angular position of the direction-finder about its vertical axis, and each time a direction-finder detects a light source its signal enables an electronic gate which thereupon lets through the information from said digital encoder concerning the angle at which said direction-finder sees the light source.

8. A device according to claim 1, characterized by the fact that the aircraft heading computer means is an electronic computer including digital decoders, said store registering the four angle data supplied by the digital encoders and a constant datum $\gamma_0$ defining the angle formed by the direction of alignment of the encoders and direction-finders with a reference direction such as the geographical North, said computer being the computer of the device itself, the onboard computer of the aircraft, or the control tower computer.

9. A device according to claim 8, characterized by the fact that when the same is used on an aircraft-carrier the datum $\gamma_0$, which varies continuously as a function of the ship's heading, is transmitted to said store by the ship's heading sensing means.

10. A device according to claim 1, characterized by the fact that it includes ground-based means for detecting two markers fixed to the aircraft and defining the fore-aft axis or flight axis thereof, said means remaining respectively locked on to said markers, means for orientating these detecting means whereby to make their boresights parallel, means associated to said detecting means and determining the angles at which the aircraft markers are seen by said detecting means, a store for registering these angles, and computer means which upon acquiring this angle data after interrogating said store solve an equation in order to determine the aircraft heading.

11. A device according to claim 10, characterized by the fact that the detecting means include an initially orientated arm capable of pivoting azimuthally and supporting, at equal distances from its vertical pivoting axis, two direction-finders each likewise capable of pivoting azimuthally whereby to detect the light sources in the course of the pivotal motions of said direction-finders.

12. A device according to claim 11, characterized by the fact that the distance between the two direction-finders is greater than that between the two aircraft markers.

13. A device according to claim 11, characterized by the fact that each direction-finder has placed before it an interference filter having the same characteristic as the filter associated to the light source said direction-finder must detect.

14. A device according to claim 12, characterized by the fact that the two direction-finder driving means are at least one motor which is activated by an operator, or automatically by a pilot's command, or by a command from the control tower.

15. A device according to claim 10, characterized by the fact that each direction-finder has associated to it a digital encoder which supplies the angle with respect to the supporting arm at which each direction-finder sees one of the two light sources, the data supplied by the two digital encoders being compared in an electronic comparator, and the resulting electrical signal being used to activate a motor for so rotating the direction-finder supporting arm as to make equal the fresh angles from which said direction-finders each see the light sources.

16. A device according to claim 15, characterized by the fact that a digital encoder positioned on the rotation axis of said supporting arm defines the orientation thereof with respect to its initial orientation.

17. A device according to claim 10, characterized by the fact that the aircraft heading computer means is an electronic computer equipped with said store for registering the three angle data supplied by digital encoders, the constant data relating to the distance between the two light sources, the distance between the two direction-finders, and the angle which said supporting arm initially forms with a reference direction such as geographical North.

18. A device according to claim 15, said device adapted to be used in association with an aircraft carrier, characterized by the fact that each time a direction-finder detects an aircraft marker and at the precise instant when it enables a gate which lets through the position data supplied by the digital encoder associated to that direction-finder, it interrogates a vertical-sensor in order to ascertain the aircraft-carrier's roll-and-pitch attitudes at that instant, the positional data supplied at any given instant by the two digital encoders being registered in a store together with the data defining the ship's vertical in roll and in pitch at that particular instant, a computer using these vertical-data to project in the horizontal plane positional data for computing the aircraft heading.

19. A device according to claim 1, characterized by the fact that it includes, in combination:
two markers which are two light sources fixedly mounted on the craft, lined up along the longitudinal axis of the navigation instruments of said craft and separated from each other by a certain distance;
two direction-finders of design well known per se, the boresight of each of which is orientated at a certain angle with respect to a known direction and the optical field of which contains the two markers of the craft stationary on a marked-out area, said direction-finders detecting the angles relatively to their respective orientations at which they see said markers and the electrical signals supplied by said direction-finders being encoded prior to being registered in a store at their respective addresses;
a computer of design well known per se, which may be the on-board computer of the craft and which receives from said store: the angular-position data issuing from the encoders associated to the direction-finders, the constant data concerning the orientations of said direction-finders relative to the known direction on which they were initially aligned, and the angle formed by this known direction with a reference direction such as the geographical North in the event of these two directions being different, and said computer deriving, after acquiring these data, the initial heading of the craft on to which the navigation instruments thereof must reset.

20. A device according to claim 19 for setting the headings of aircraft aboard an aircraft-carrier with complete independence from parasite rolling, pitching and yawing motion of the ship, characterized by the fact that it includes a vertical-sensor for defining the roll-and-pitch angles, expressed as electrical signals applied to the corrective elements of each direction-finder, whereby to retain the boresight thereof in a horizontal plane, said direction-finders detecting the angles at which they see the aircraft markers and transmitting angle data which are projections in the horizontal plane of said detected angles, these data being encoded and thereafter registered in a store together with the data defining the directions of the direction-finders in relation to the known direction along which the direction-finders are aligned, the angle formed by this known direction, which is preferably the ship's fore-aft axis, with a reference direction such as geographical North being supplied by a heading sensor.

21. A device according to claim 19, characterized by the fact that the aircraft markers are discriminated by being each equipped with an interference filter of different characteristics, a filter selector associated to each direction-finder inserting into the boresight of each direction-finder an interference filter matching the interference filter of a first marker to be detected, the filter selector being automatically controlled by a signal which is delivered by the direction-finder associated thereto after the same has detected the previous marker, in order to permit detection of a second marker, whereby upon detection of the angular position of a marker the direction-finder which detects the same and the selected interference filter which makes such detection possible jointly define the address of the angle information supplied by said direction-finder.

22. A device for rapidly ascertaining with great accuracy, by triangulation, the orientation of a stationary movable object in relation to a reference direction and more particularly for ascertaining the heading of an aircraft, characterized by the fact that it includes ground-based means for detecting two first markers fixed to the aircraft and defining the longitudinal or flight axis thereof, means associated with said detection means and determining the angles at which said first aircraft markers are seen by said ground based detection means, a store for registering said angles, computer means which upon acquiring said angle values after interrogating said store solve an equation for determining the aircraft heading, said ground-based means being vehicularly mounted, so as to be freely transportable to the vicinity of said aircraft having a known initial heading, and two second ground markers, the joining line of which defines a known reference direction, said ground-based means detecting said second ground markers comprising two powerful light sources spaced from each other, a further computer, such as a control tower compouter, utilizing the data relating to the angles at which said second ground markers are detected by said ground-based means to derive the orientation of said ground-based means, corresponding information being retransmitted to said store for subsequent use in computing said initial aircraft heading.

No references cited.

BENJAMIN A. BORCHELT, Primary Examiner

S. C. BUCZINSKI, Assistant Examiner

U.S. Cl. X.R.

343—112 C; 356—172